F. W. BARTLETT.
METHOD OF PRODUCING A VACUUM IN A METALLIC WALLED CHAMBER AND SEALING THE SAME.
APPLICATION FILED JUNE 23, 1911.
1,150,242. Patented Aug. 17, 1915.
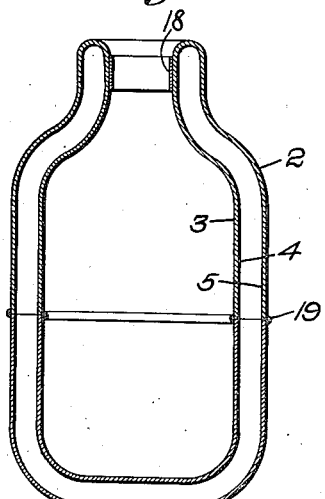
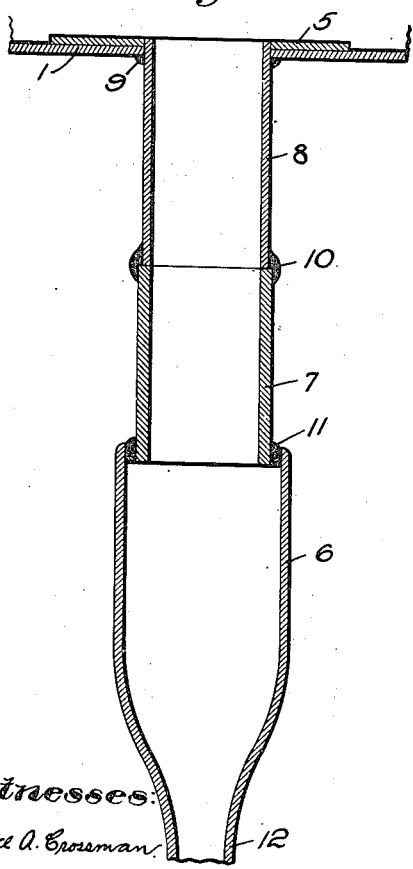
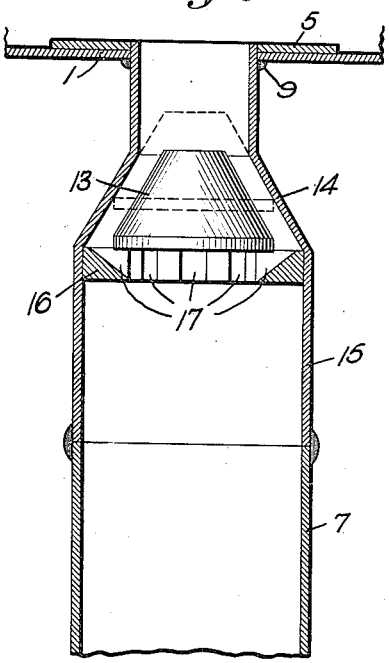
Witnesses:
Horace A. Crossman
Carl L. Choate
Inventor:
Frederick W. Bartlett.
by Emery Booth Janney Varney
Attys.

UNITED STATES PATENT OFFICE.

FREDERICK W. BARTLETT, OF CALDWELL, NEW JERSEY.

METHOD OF PRODUCING A VACUUM IN A METALLIC-WALLED CHAMBER AND SEALING THE SAME.

1,150,242.    Specification of Letters Patent.    Patented Aug. 17, 1915.

Application filed June 23, 1911. Serial No. 634,880.

*To all whom it may concern:*

Be it known that I, FREDERICK W. BARTLETT, a citizen of the United States, and a resident of Caldwell, county of Essex, State of New Jersey, (whose post-office address is Overlook Road, Caldwell, New Jersey,) have invented an Improvement in Methods of Producing a Vacuum in a Metallic-Walled Chamber and Sealing the Same, of which the following description, in connection with the accompanying drawings, is a specification, like characters on the drawings representing like parts.

This invention relates to improvements in methods of producing vacuum walled containers and more particularly to double walled containers formed in whole or in part of metal and provided with a vacuum heat-insulating space between the metallic walls of the container.

The object of the present invention is the production and retention between the walls of a metal-walled container of a high vacuum substantially equal to that customarily obtained between the walls of a glass container.

Heretofore efficient vacuum containers have been made almost exclusively of glass, such metallic containers as have been used being provided with an insulating space having a relatively poor vacuum and being incapable of use for any such purposes as the glass containers are employed, such, for example, as the maintaining of liquids for long periods of time at a relatively high or low temperature compared with that of the surrounding atmosphere. As is well known, an effective vacuum walled container should have a vacuum of from one-twenty-five thousandth (.00004) of a millimeter to one thirty thousandth (.000033) of a millimeter, but so far as I am aware, such conditions in a metallic container have never been approximated.

In carrying out my invention I preferably employ a high vacuum pump such as the mercury pump now commonly employed for exhausting the insulating space of a glass walled container. I have found that best results are obtained by the use of glass connections between the pump and the vacuum space hermetically joined to the container. The container and its connections, however, are subjected to a high degree of heat during the exhaustion process, and where a container of any common metal is used the unequal expansion of the glass and the metal of the container under the application of the intense heat invariably causes a rupture, cracks or fissures and consequent leakage at the joint between the glass and the metal.

In carrying out my invention I employ any common or suitable metal for the walls of the vacuum chamber, but provide the same with a metallic outlet duct of some metal having a coefficient of expansion the same or approximately the same as that of glass. A short tube of such metal which may, for example, be platinum, is soldered or otherwise united to the walls of the container or to another metallic duct connected to the container and to this platinum tube is fused a glass tube connected to the pump or other exhausting agent. This provides a hermetically sealed joint between the container outlet and the glass tube leading to the pump which is substantially impervious to all leakage and whereby a high vacuum of the required degree can readily be obtained.

In order to place the process on a commercial basis and avoid the use of a fresh platinum tube for each container, provision is preferably made whereby after the glass tube has been sealed off between the platinum and the pump to permit the disconnection of the latter, an intermediate connection between the platinum and the container may also be sealed up permitting the platinum to be detached from the outlet duct and employed for exhausting another container. While a high vacuum can be obtained through this process, by employing any of the common metals having low heat conductive properties, particularly where a selection is made of a metal having great density and slight porosity, I may and preferably do prepare the metal surfaces which face the vacuum space by coating them with a substance which will act as an enamel or glaze to close up the very fine pores of the metal, thus preventing absorption of the air by the walls of the vacuum space as well as leakage through the walls.

The invention will be best understood by reference to the following description when taken in connection with the accompanying illustration showing one specific embodiment thereof, while its scope will be more particularly pointed out in the appended claims.

In the drawings: Figure 1 shows a conventional form of vacuum walled container illustrating one application and embodiment of the invention; Fig. 2 is a sectional detail on a larger scale showing the attachment of the pump connection to the container in Fig. 1; Fig. 3 is a view similar to Fig. 2 showing a modified form of connection employing a valved outlet passage.

Referring to the drawings and to the embodiment of the invention therein shown, I have illustrated at 1 a double walled metallic container, herein shown as a bottle or similar vessel for holding liquids or the like and intended to prevent heat interchange between the contents of the bottle and the outside air.

While I have shown the invention as applied to a vacuum bottle, it will be obvious that such application is illustrative merely and that the invention is applicable to fireless cookers, refrigerator linings or the walls or linings of any such articles or devices as are required to be insulated against the passage of heat.

German silver or any other suitable metal may be used, the selection being preferably made, however, to procure one of high density and tensile strength, low heat conductivity, and one capable of taking a high polish. I have found, for example, that the metal known commercially as "Monel" metal is well suited for this class of work. To the exterior of the double metallic walls of the container at 2 and 3 there is preferably applied a high polish. Such polish may be applied naturally if the nature of the metal will permit, or may be had by silver plating the surface or any other suitable method.

Interiorly within the vacuum space the double walls of the container are preferably coated with a substance, preferably non-heat-conducting, adapted to close the pores of the metal. Such substance may be any of the well known enamels or glazes adapted to be used in connection with a metallic surface or may be a common japan or asphalt, the purpose being to provide a firm, hard, dense surface which will not absorb or retain air during the exhaustion process and will also prevent the subsequent deterioration of the vacuum by the passage of air through the very fine pores of the metallic body. Such non-porous coating is represented at 5 in Figs. 2 and 3 and its location indicated in Fig. 1 also by the numeral 5. The material for this coating may be introduced through the outlet opening of the vacuum space of the container after the latter has been assembled and completed in the form shown in Fig. 1, and by agitation and heat may be applied uniformly to the inner surface of the vacuum space in the form of a thin film.

As represented in Fig. 1 the glass duct or connection 6 to the air pump is in the form of a tube and is attached to the container by means of a platinum outlet duct herein in the form of a tube 7 and an intermediate metallic tube 8 of tin, copper, or other metal, the latter constituting the immediate outlet duct for the container. The tube 8 as shown in Fig. 2 is attached to the container in any suitable manner as by a small body of silver solder 9. At its outer end it is secured to the platinum tube 7 in any suitable way, as by the body of silver solder 10. The outer end of the platinum tube 7 in turn is fused to the glass tubing 6 so that there is provided from the glass tube to the container an air conducting passage hermetically sealed and impervious to all leakage. The connection between the platinum tube 7 and the glass tube 6 may be facilitated by the use of an annulus 11 of bluecane or sealing in glass. This is a blue hued glass commonly used for sealing in purposes in incandescent lamp manufacture, usually sold in cane form and known to the trade as "blue cane glass." A contracted portion 12 is provided in the glass tube just below the platinum 7 so that it can be readily heated thereat and sealed off after the pumping operation. The tube is connected to a high vacuum mercury pump (not shown) of the type customarily used in exhausting glass vacuum containers which pumps are capable of producing a vacuum of from .00004 to .000033 of a millimeter.

After the pumping operation has been completed the glass tube is sealed at 12 and the pump disconnected. The container may be left indefinitely in this condition without detriment to the vacuum. To provide a commercial process, however, and permit the employment of the relatively expensive platinum over and over again, the outlet duct is preferably heremtically sealed up between the platinum and the container and the platinum tube 7 removed. This sealing may be performed in any desired manner but to permit an effective hermetic seal to be obtained at the tube 8, the latter may be made of some metal capable of being fused at an easily obtainable temperature although at a temperature above that to which the container is subjected during the exhaustion process. For example, block tin in tubular form might be used for the outlet duct 8. After the glass tube is sealed at 12 the tube 8 may be then pinched together and finally sealed by fusing, after which the platinum tube can be removed.

In Fig. 3 I have shown a connection intermediate the platinum tube 7 and the container which permits a most ready, certain and effective sealing of the immediate outlet duct. Herein a valve 13 is placed in the outlet duct which valve while not interfering with the exhaustion process, may be utilized to close the duct and seal the container after the vacuum space has been exhausted.

Any suitable form of valve may be used but herein a cone-shaped check valve is shown adapted to seat against a tapered portion 14 of the outlet duct 15. A ring 16 of silver solder is located in that portion of the duct which is of larger diameter on which ring the valve is adapted to rest during exhaustion. Such ring is grooved at 17 to permit the passage of air about the edges of the valve. After the vacuum space has been exhausted, the glass connections sealed off and the pump disconnected, the container may be inverted to insure the movement of the valve to its seat as shown in dotted lines in Fig. 3. The ring 16 of solder is then heated to the melting point. The heated metal flows down and around the exposed face of the valve soldering and sealing the same in position and effectively sealing the outlet of the container. The tube 15 can then be cut off below the valve and the platinum tube utilized for exhausting another container.

In constructing the container it may be desirable to apply to the neck of the vessel at 18 a sleeve or lining of metal having relatively high non-heat conducting properties, such lining providing an interceptor or partition between the stopper or closure for the vessel and the walls thereof and adapted to prevent the transmission of heat thereto. I have found, for example, that the metal commercially known as "Nichrome" constitutes such a high non-heat conducting material and may be usefully employed for this purpose.

To strengthen the container additional reinforcement may be employed. Such reinforcement may be of any suitable material, but herein the container is formed of upper and lower sections which are welded or brazed together so as to form a beading or enlargement 19 encircling the walls of the container and strengthening the same thereat.

While I have herein shown and described for purposes of illustration one specific form of the invention, it is to be understood that the same is not limited to the embodiment herein shown or the particular application made thereof, but that extensive deviations may be made without departing from the spirit of the invention.

Claims.

1. The method of producing a vacuum in a metallic walled chamber and sealing the same which consists in connecting thereto an outlet duct composed of a metal having a coefficient of expansion approximating that of glass, fusing the latter to a glass duct, connecting the latter to a high vacuum exhausting agent utilizing the latter to exhaust the container and then sealing the container.

2. The method of producing a vacuum in a metallic walled chamber and sealing the same which consists in connecting a platinum outlet duct to the container, connecting the latter to a glass duct, connecting the latter to an exhausting agent, utilizing the said agent to exhaust the container and sealing the container between its metallic wall and the platinum portion.

3. The method of producing a vacuum in a metallic walled chamber and sealing the same which consists in connecting the latter to a metallic outlet duct having a coefficient of expansion approximating that of glass, providing a valved passage between the latter and the metallic container, connecting the outlet duct to a glass duct, connecting the latter to an exhausting agent, utilizing the latter to exhaust the container, permanently closing up the valved passage between the outlet duct and the container and removing the outlet duct.

4. The method of producing a vacuum in a metallic walled chamber and sealing the same which consists in connecting thereto an outlet duct composed of a metal having a coefficient of expansion approximating that of glass, fusing the latter to a glass duct, connecting the latter to a high vacuum exhausting agent, utilizing the latter to exhaust the container, and sealing off the connection between the exhausting agent and the container.

5. The method of producing a vacuum in a metallic walled chamber and sealing the same which consists in uniting the latter to a platinum outlet duct, uniting the platinum duct by a fused body of glass to a glass duct, utilizing an exhausting agent to exhaust the container through the glass and platinum connection, sealing off the glass, and subsequently sealing the container and removing the platinum.

6. The method of producing a metallic, vacuum walled container, exhausting and sealing the same which consists in coating the metallic walls of the vacuum space with a pore filling material, connecting the said metallic wall to a metallic outlet duct formed of platinum, providing a valved
5 passage between the platinum and the metallic wall connecting the outlet duct to a glass duct, connecting the latter to an exhausting agent, utilizing the exhausting agent to exhaust the container, permanently
10 closing up the valved passages between the outlet duct and the container and removing the platinum duct.

In testimony whereof, I have signed my name to this specification, in the presence of two subscribing witnesses.

FREDERICK W. BARTLETT.

Witnesses:
    LUCIUS E. VARNEY,
    JOHN W. THOMPSON.